United States Patent [19]

Tobias et al.

[11] 4,136,803
[45] Jan. 30, 1979

[54] METHOD AND MECHANISM FOR CONVERSION OF FREE ACCESS ICE CHESTS TO PROVIDE CONTROLLED DISPENSING OF ICE

[75] Inventors: Lamar K. Tobias, 615 N. Lakeview Apt 101, Sturgis, Mich. 49091; Jerry J. Motyka, Detroit, Mich.

[73] Assignee: Lamar K. Tobias, Sturgis, Mich.

[21] Appl. No.: 801,534

[22] Filed: May 31, 1977

[51] Int. Cl.² .......................................... B65G 33/20
[52] U.S. Cl. ................................................. 222/413
[58] Field of Search .................... 221/75, 150 R, 203; 222/146 C, 333, 413

[56] References Cited
U.S. PATENT DOCUMENTS

| | | | |
|---|---|---|---|
| 1,206,088 | 11/1916 | Boatright | 222/413 |
| 3,119,518 | 1/1964 | Eschenburg et al. | 222/333 X |
| 3,610,482 | 10/1971 | Steenburgh, Jr. | 222/413 |

*Primary Examiner*—Stanley H. Tollberg
*Attorney, Agent, or Firm*—Krass & Young

[57] ABSTRACT

A method and mechanism is disclosed for the conversion of ice chests of the type having a door to enable removal of unlimited quantities of ice as are in common use in hotels, motels, etc. The method involves a modification to the access door by the installation of an ice conveyor mechanism extending downwardly into a collector hopper placed within the ice chest bin. The ice lift conveyor mechanism is controlled by a token or coin-operated device to limit the quantity of ice dispensed from the ice chest. The ice lift conveyor mechanism is disclosed as a manually operated auger extending into the collector hopper with rotations of the auger controlled by a solenoid interlock gear mechanism, in turn controlled by a coin or token-operated control device. The portions of the ice lift conveyor mechanism and related parts passing through the access door are enclosed by a sheet metal enclosure housing to prevent tampering and which sheet metal is further provided with a chute door designed to prevent tampering with the ice lift mechanism, only the coin slot and the manually-operated handle being exposed externally of the enclosure housing.

10 Claims, 4 Drawing Figures

METHOD AND MECHANISM FOR CONVERSION OF FREE ACCESS ICE CHESTS TO PROVIDE CONTROLLED DISPENSING OF ICE

BACKGROUND OF THE INVENTION

1. Field of the Invention

This invention concerns the dispensing of quantities of ice in various dispensable forms such as ice cubes, craked ice, etc., more particularly, is concerned with a method and mechanism for retrofitting ice chests of the type which have allowed relatively unlimited access thereto to convert the same into a controlled access ice chest.

2. Description of the Prior Art

Free access ice chests are in extremely widespread use in such establishments as hotels and motels. These ice chests generally comprise a large bin or storage chest, access to which is obtained through an access door located along a sloping front surface on the upper portion of the ice chest housing and which enables a motel guest to freely remove ice cubes or cracked ice.

Since the halls and other areas where such machines are located are oftentimes located in areas which non-guests may obtain admission, problems have occurred in unauthorized persons removing ice, quantities of which are maintained in the bin by an ice making apparatus normally disposed within the housing.

This free access has created certain other problems: The unlimited amounts of ice available to those having access results in excessive usage, i.e., as by the practice of filling protable ice chests, since the quantities of ice which are made by the associated ice making machines are not feasibly sized to provide for such excessive consumption, difficulties arise with other persons which are intended to be provided with ice cubes, etc. creating customer relation problems in the aforementioned hotels, motels or similar establishments.

A further problem is that of the potential and occasional introduction of contaminants, vermin, etc. into the ice bin.

In co-pending patent application Ser. No. 697,778 filed June 21, 1976 is disclosed an arrangement for providing a token-operated dispenser which can be utilized in conjuction with such ice bins to allow appropriate limited access by issuance of predetermined numbers of tokens to the clientele of such establishments. Ice dispensing machines which have been coined-controlled to provide limited access to quantities of ice are, of course, very well known and in widespread use in the context of the sale of ice to the public. However, the problem involved both with the approach described in the aforementioned patent application and the general approach to ice dispensing in a vending machine context such as a coin-operated ice dispenser is that substantial modification of the major structural components of the machines would be required in converting existing ice chests. Since such ice storage chests are relatively large and bulky, the economic modification of such units would appear to be unfeasible since extensive on-site installation procedures would thus be involved, such as cutting large openings in the housings, etc. Also, the economies of scale, and efficiencies provided by an in-shop manufacture would not be available.

This problem with such dispenser designs in this context is caused by the fact that generally the movement of ice through the dispensing opening is induced or aided by gravity. This is brought about generally by the location of the dispensing devices below the bulk quantity of ice from which the dispensed quantities are drawn. Since in the structural details of such ice chests the access door is provided at an upper location relative to the ice bin, the typical application of such prior art metering and dispensing apparatus would necessitate modifications of the main housing in order to provide an access opening which would be below the leval at which the ice is disposed in the ice bin.

In U.S. Pat. No. 3,390,537 there is disclosed an ice transport-conveyor mechanism which is adapted to move ice particles upwardly from a storage location. However, the application described in that patent is involved in removing ice particles floating on the surface of a liquid medium and as such, would not have particular application to the aforementioned dispensing of bulk quantities of ice located within a bin.

Any such dispensing mechanism which would be used for this application should very desirably have as a design feature simplicity and reliability of operation, since usage would be heavy and the annoyance factor to hotel guests, upon encountering an inoperative device would be substantial to defeat in some respects the basic aims of providing limited access.

A further desirable design feature would be the protection of the device from tampering and abuse, since vending apparatus tends to be subject to abuse in the event of malfunction. Such tampering could also be to circumvent the limited access function of the device.

It is accordingly an object of the present invention to provide a method for converting of unlimited access ice chests of the sort described to provide a limited access which may be applied to existing ice chests without modification of the major structural compenents.

It is a further object of the present invention to provide a dispensing mechanism for use in carrying out the conversion method which is simple and reliable in operation.

It is yet another object of the present invention to provide such a mechanism which involves a minimal exposure of vulnerable components thereof to provide protection against abuse and tampering.

SUMMARY OF THE INVENTION

These and other objects of the present invention which will become apparent upon a reading of the following specification and claims are accomplished by modifying the access door of the ice chest by installing an ice dispenser which is controllably operable to allow conveying of a metered quantity of ice upwardly through an opening formed through the access door, the access door being permanently sealed shut and a collector hopper disposed within the ice chest storage bin to direct the ice stored within the ice storage bin to the inlet terminus of a lift conveyor mechanism included in the ice dispenser and which is comprised of a manually-operated auger device. Controlled dispensing is accomplished by a token-operated releasable lock normally preventing manipulation of a rotary drive for the auger device, which releasable lock limits the extent of rotation of the auger and thereby the quantity of ice lifted within the collector hopper and conveyed through the access door. The outlet terminus of the auger device is disposed within an enclosure mounted to the exterior of the access door and enclosing the exposed components of the lift conveyor mechanism extending through the access door. A pivoted chute door is located to receive the ice dispensed by operation of the lift conveyor mechanism, which door is arranged to prevent access to the interior of the enclosure housing. The releasable lock comprises a solenoid-operated locking plunger controlled by a cam-operated limit switch, the deposit of a coin or token generating an electrical signal which produces activation of a solenoid and release of the auger drive mechanism until the auger has been rotated sufficiently to enable the cam to operate the limit switch, in turn generating an electrical signal causing release of the solenoid locking plunger to prevent further rotation of the auger. The quantity of ice dispensed is thus controlled to be that quantity dispensed by the extent of rotation of the auger allowed.

DETAILED DESCRIPTION

In the following detailed description, certain specific terminology will be utilized for the sake of clarity and a specific embodiment described in accordance with the requirements of 35 USC 112, but it is to be understood that the same is not intended to be construed and, indeed, should not be so-construed, inasmuch as the present invention is capable of taking many forms and variations within the scope of the appended claims.

Figure 1:
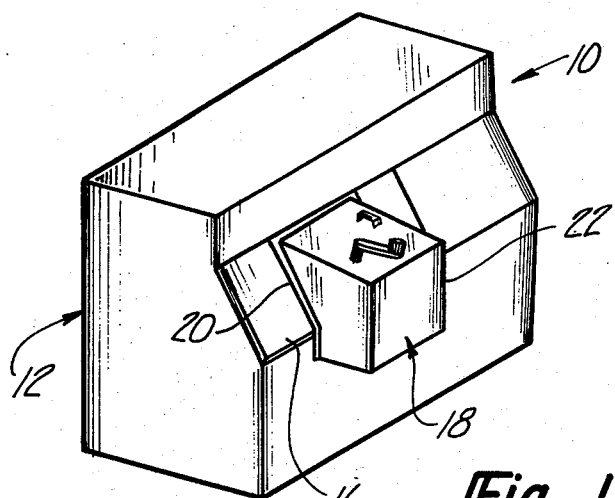
FIG. 1 is a perspective view of an ice storage chest which has been converted according to the present invention to provide limited access thereto.

In FIG. 1 is shown an ice chest 10 typical of the type to which the present invention is intended to be applied. This type of unit includes a main housing 12 within which are enclosed the ice making and related equipment (not shown) which operate to generate either crushed, cubed, flaked or other flowable forms of ice, with the ice being accumulated in a storage bin 14, shown in FIG. 2. Access to the storage bin is by a frontal access door 16 located over an opening 17 which is inclined to the vertical as shown in FIG. 1, and located above the level of the ice accumulated in bulk within the storage bin 14.

A person desiring access to the ice chest 12 opens the door and removes the quantity of ice desired through the access door 16.

According to the present invention, the access door 16 is modified by the installation of an ice dispensing mechanism 18 and the permanent sealing or locking of the frontal access door 16.

In the present version of the invention, such locking would be accomplished by riveting or otherwise securing a flange 20 integral with an enclosure housing 22 and forming a part of the dispensing mechanism 18 according to the present invention both to the frontal access door 16 and to the housing 12 of the ice chest 10, as shown in FIG. 1.

Thus, the frontal access door 16 becomes locked and access to the storage bin 14 is thus limited by the operation of the dispensing mechanism 18.

Figure 2:
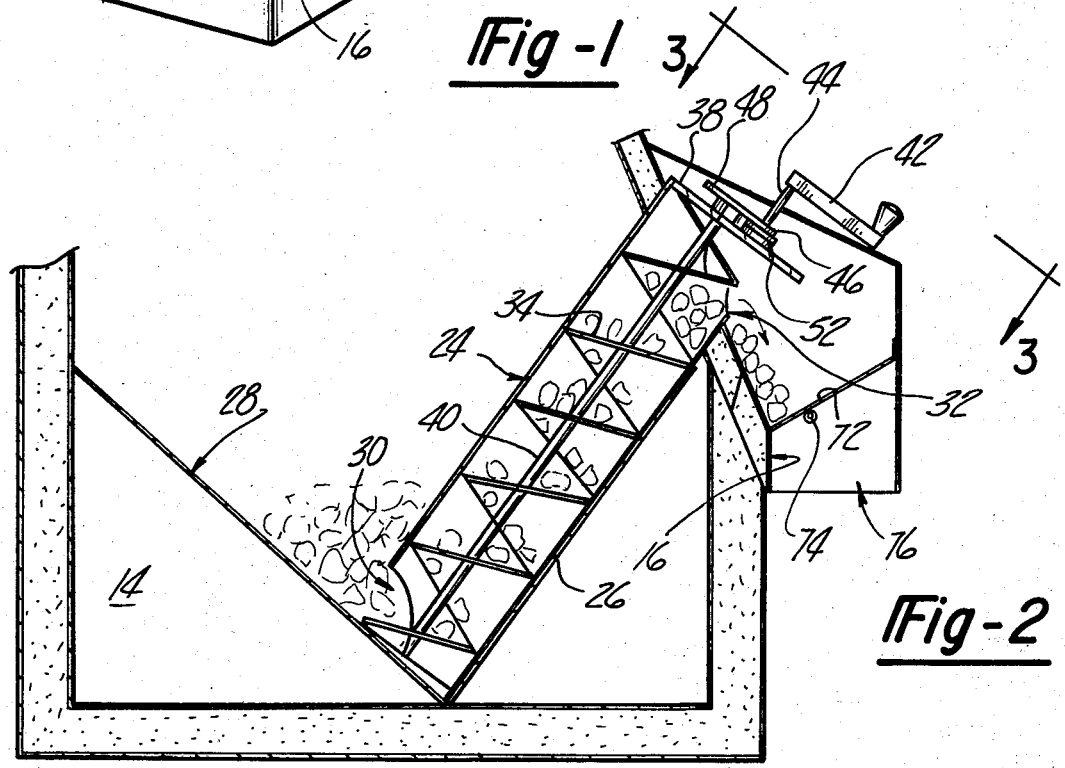
FIG. 2 is a fragmentary sectional view of the converted ice chest shown in FIG. 1.
Figure 3:
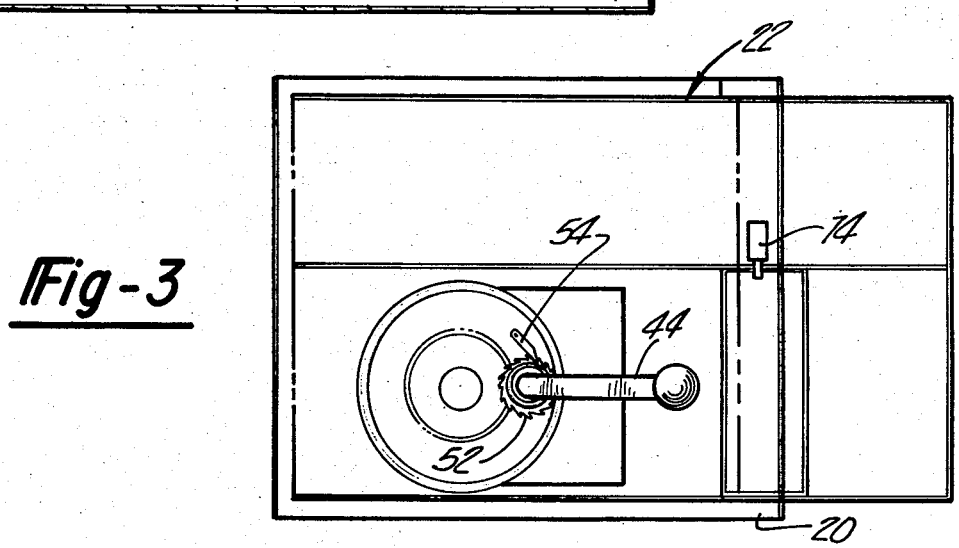
FIG. 3 is a view of the dispenser mechanism, shown in FIG. 2, taken in direction of the arrows 3—3 in FIG. 2.
Figure 4:
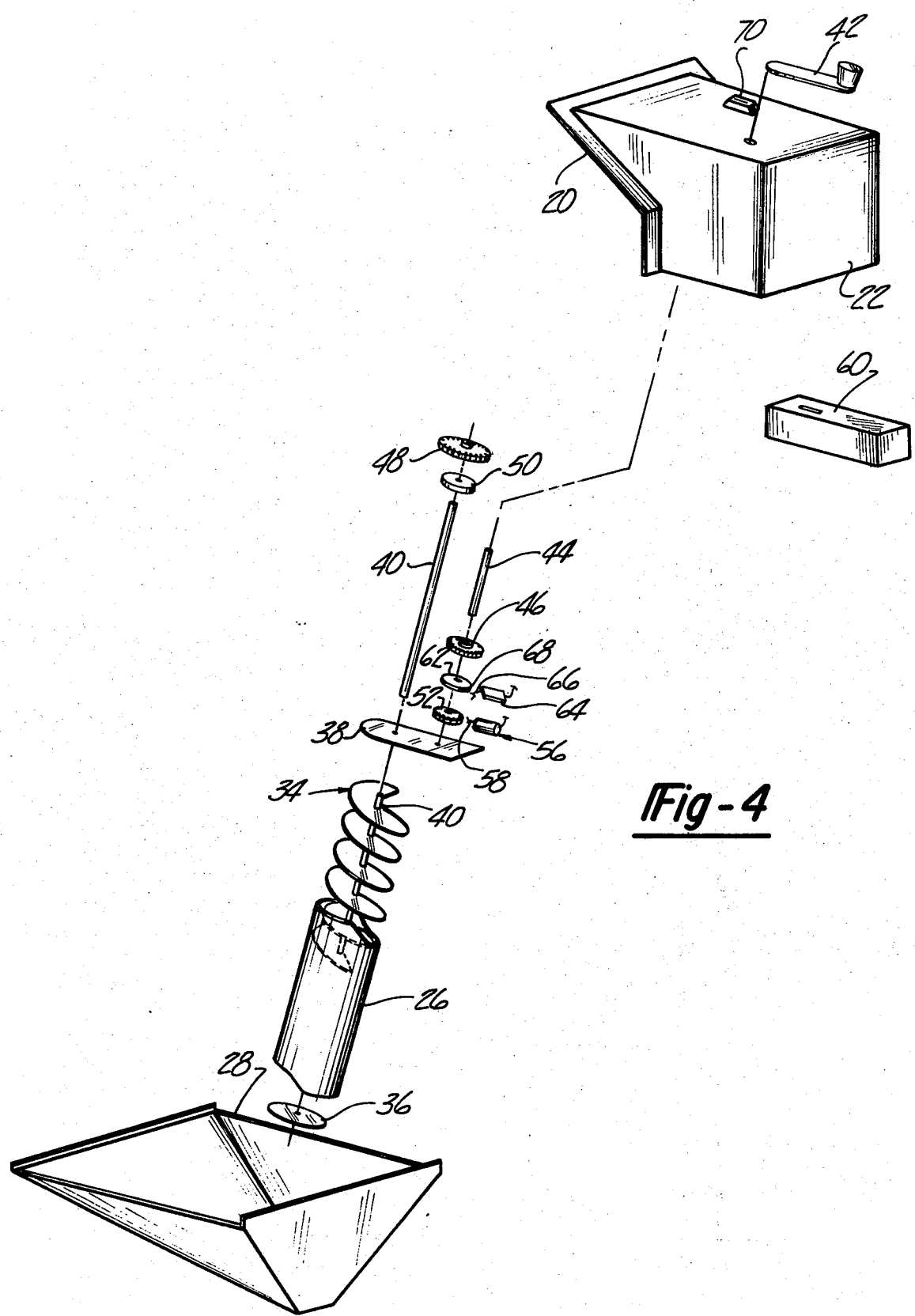
FIG. 4 is an exploded perspective view of the major components of the dispenser mechanism according to the present invention, as shown in FIGS. 1 through 3.

The dispenser mechanism 18, as shown in FIGS. 2 through 4, includes a lift conveyor mechanism 24 for moving the cubed or crushed ice disposed within the storage bin 14 upwardly and through an opening formed in the frontal access door 16 which has been fabricated in the course of carrying out the method of conversion according to the present invention.

The lift conveyor mechanism 24 includes a tubular hosing 26 extending through the frontal access door 16 at its upper end and at its lower end is disposed within a collector hopper 28 which, according to the present invention, is disposed within the storage bin 14 and adapted to collect the ice normally caused to be accumulated within the storage bin 14 and guide the same towards the lower end or terminus of the lift conveyor 24. The tubular housing 26 is formed with a pair of lateral openings, a first opening 30 at its lower end is disposed so as to receive quantities of ice material disposed within the collector hopper 28. Ice is guided into the opening by the action of gravity since the tubular housing is disposed such that the inclination is at an angle to the vertical such that gravitation will insure feeding of ice material into the opening 30.

The upper end of the tubular housing 26 is formed with a second lateral opening 32 which is oppositely located to the first lateral opening 30, such that the inclination of the tubular housing 26 creates a gravity assisted discharge of the quantities of ice which are conveyed through the tubular housing 26 from the collector hopper 28. The conveying of the ice material which is disposed in the collector hopper 28 upwardly through the tubular housing 26 is accomplished by an auger device including an auger element 34, which is inclined at the same axis as the tubular housing 26 and disposed and mounted for rotation therein. An end cap 36 and an upper cover plate 38 receives the stem shaft 40 which is integral or secured to the auger element 34 and acting to rotationably mount the same within the tubular housing 26.

Rotation of the auger element 34 within the tubular housing 26 causes in one direction tending to move the ice material collected within the lateral opening 30 upwardly through the tubular housing 26 and forcing the same out through the lateral opening 32 formed at the upper end of the tubular housing 26 and which is disposed exteriorly of the front access door 16.

Rotation of the auger element 34 is accomplished by means of a manually operable handle which is drivingly connected to the auger element 34 by means of a crank shaft 44 rotatably mounted within the end plate 38 and having secured thereto a pinion gear 46, drivingly engaged with a second larger pinion gear 48, affixed to the stem shaft 40 and axially positioned thereon by means of a spacer 50.

The lift conveyor mechanism 24 is designed according to the concept of the present invention to be controllably operated so that a metered quantity of ice or other material to which the device may be applied is dispensed by operation of the dispensing mechanism 18. This is carried out by an arrangement for both releasing and locking the handle 42 against rotation with the rotation allowed upon its release being controlled to a predetermined limited extent of rotation. This is carried out by means of a ratchet gear 52 which is secured to the crank shaft 44 which is caused to limit rotation of the handle 42 in a single direction, i.e., that direction inducing the lifting-conveying and dispensing of the ice material disposed within the collector hopper 28 to the second lateral opening 32. This limitation is provided by a pawl 54 pinned to the end plate 38 to provide a conventional ratchet mechanism constraining rotation of the handle 42 in the clockwise direction, as viewed in FIG. 3, which will produce the desired upward movement of the ice material within the tubular housing 26.

Rotation of the handle 44 (and thereby the rotation of the auger element 34) in the clockwise direction is in turn controlled by a solenoid actuated locking plunger assembly 56 which has a locking plunger element 58 adapted to be moved into and out of engagement with the ratchet gear 52 completely preventing rotation of the ratchet gear 52, and thereby the handle 44 of the auger element 34, whenever the locking plunger 58 is in engagement therewith.

Upon retraction of the plunger 58 and upon energization of the solenoid assembly 56 the ratchet gear 52 is released freeing the handle 52 for clockwise rotation, allowing rotation of the auger element 34. According to the present invention, the operation of the locking solenoid 56 is controlled by virtue of a coin or token-receiving mechanism 60 which is adapted to generate an electrical signal upon deposit of an appropriate token or coin which causes the solenoid relay (not shown) to be set, energizing the solenoid 56 and causing retraction of the locking plunger 58 and allowing release of the ratchet gear 52, enabling the handle 42 to be rotated.

Also affixed to the crank shaft 54 is a rotary cam plate 62 which acts to interact wit a limit switch 64 having an operating lever 66 in engagement with the rotary cam plate 62 and which acts to reset the solenoid relay upon rotation of the handle 42 and the rotary cam 62 a full revolution, at which point the cam has a lobe point 68 which causes the limit switch operating lever 66 to close the limit switch resetting the solenoid plunger relay and causing de-energization of the solenoid assembly 56 and a re-engagement of the locking plunger 58 with the ratchet gear 52 to lock the ratchet gear 52 and the associated gears to prevent further rotation of the auger element 34.

Thus the quantity of ice material dispensed is limited to that which is conveyed in a complete revolution of the auger element 34.

The coin-receiving mechanism 60 may be of any of many very well known designs which serve to generate appropriate signals upon deposit of the appropriate coins or other tokens. According to the application of the present invention, it is contemplated that commonly tokens would be utilized rather than monetary volue coins, since the quantity of ice which is to be distributed to guests in hotels and other establishments is not contemplated as being charged to the guest, but rather merely limited such that a certain number of tokens would be issued to each guest which would be related to a quantity of ice which was deemed to be a reasonable usage.

Since such devices are very well known in the art, it is not considered here necessary to describe the same in detail. This is likewise applicable to the specifics of the control circuitry associated with the locking solenoid assembly 56 and the limit switch 64, since merely a simple relay circuit of very straightforward design may be utilized satisfactorily.

The enclosure housing 22 is designed to completely or almost wholly enclose those portions of the dispensing mechanism 18 which are disposed exteriorly of the frontal access door 16 so as to prevent abuse and tampering with these elements and also to provide a exit chute for the quantity of ice dispensed by the lift conveyor 24. Only the handle 42 is disposed exteriorly and a coin-receiving slot 70 would be exposed.

The enclosure housing, as described below, also acts to mount the dispenser mechanism 18 to the frontal access door 16 and by virtue of being riveted or otherwise permanently secured to the main cabinet structure 12, provides the permanent locking or sealing of the frontal access door 16 to convert the original free access ice storage bin to a limited ice storage bin, that being limited to the quantity of ice which may be dispensed via the dispenser mechanism 18.

The chute door 72 is provided which is pivoted at 74, which arrangement further limits access to the lift conveyor components and which is adapted to be opened by the weight of the ice by pivoting about the hinge 74 and the quantity of ice so-dispensed dropping out to the lower opening 76.

In the practice of the method according to the present invention, it can be seen that only the frontal access door 16 is necessary to be modified to any extent and reworking of such doors could be done on a high production level in a factory site with appropriate fixturing and tooling by cutting appropriate openings in the frontal access door 16 and mounting the enclosure housing 22 thereto. Thus, the only on-site installation requirements would be the running of electrical power to the electric control system if that is the design which is utilized and the riveting or securement of the flange 20 to the main cabinet structure 12. This process could thus be economically carried out with converted doors carried to the site and a relatively simple, quick installation to the limited access storage chest 10 converting the same into a limited access storage bin. It can also be appreciated by virtue of the manual operation or manipulation of the lift conveyor means that with very simple components that the device is highly reliable and simple and is relatively inexpensive to manufacture. Further, the components are shielded by the enclosure housing 22 with only the operating handle 42 being exposed so to prevent the abuse and tampering described above. It can thus be seen that the above-recited objects of the present invention have been accomplished by the arrangement method described in the present Specification.

Many alternate forms of the invention are, of course, possible. For example, a mechanically-operated, coin-controlled drive such as is disclosed in the above-cited co-pending patent application could be substituted for the solenoid coin switch arrangement described.

The embodiments of the invention in which an exclusive property or privilege is claimed are defined as follows:

1. A method of converting a free access ice chest to a limited access ice chest of the type including a housing enclosing a storage bin for containing bulk quantities of ice, and an access door located over an access opening communicating with the storage bin, the method including the steps of:

mounting a lift conveyor mechanism to said access door, said lift conveyor thereof extending downwardly into said storage bin and including:

a tubular housing extending into said ice chest;

an auger element disposed within said tubular housing and mounted for rotation therein, said tubular housing having openings at either end, one of said openings adapted to receive said ice at said end disposed in said storage bin and said other opening allowing dispensing therethrough of ice at the other end of said tubular housing produced by rotation of said auger element;

locking said access door to prevent opening thereof;
installing a handle enabling manual rotation of said auger element;
controlling the rotation of said auger element by said handle by controllably releasing said auger element for rotation and locking said auger element against rotation, whereby the quantity of ice dispensed by rotation of said handle may be metered;
whereby limited access to said storage bin is provided by controlled operation of said lift conveyor mechanism.

2. The method according to claim 1 further including the step of disposing a collection hopper in said storage bin adapted to collect ice passed into said storage bin towards the ice receiving opening in said tubular housing.

3. The method according to claim 1 further including the step of securing an enclosure to the exterior of said access door substantially enclosing said lift conveyor mechanism.

4. The method according to claim 1 wherein said step of controlling rotation of said auger element by said handle includes the step of providing a coin-operated control over the locking and release of said auger element.

5. An arrangement for dispensing material from within an enclosed space comprising:
a storage bin disposed in said enclosed space adapted to receive said material;
a material conveyor mechanism extending into said enclosed space and received within said storage bin, said material conveyor mechanism including:
a tubular housing extending into said enclosure and said storage bin; an auger element disposed within said tubular housing and mounted for rotation therein, said tubular housing having openings at either end, one of said openings adapted to receive said material at said end disposed in said storage bin and said other opening allowing dispensing therethrough of material at the other end of said tubular housing produced by rotation of said auger element;
means for manually rotating said auger element including a handle and means drivingly connecting said handle and said auger element producing rotation of said auger element by rotation of said handle;
means controlling the rotation of said auger element by said handle including means controllably releasing said auger element for rotation and locking said auger element against rotation, whereby the quantity of material dispensed by rotation of said handle may be metered.

6. The dispenser arrangement according to claim 5 wherein said tubular housing and said auger element extend in a downward direction into said storage bin, whereby said material is moved upwardly out of said storage bin.

7. The dispenser arrangement according to claim 5 further including a coin-operated control means enabling rotation of said handle for a predetermined extent of rotation, whereby the quantity of material dispensed is controlled thereby.

8. The dispenser arrangement according to claim 7 further including a collector hopper disposed in said storage bin adapted to direct material disposed in said storage bin towards said portion of said auger element and said tubular housing disposed within said storage bin.

9. The dispenser arrangement according to claim 5 further including an enclosure housing enclosing said portions of said material conveyor mechanism extending out of said enclosed space, said handle disposed exteriorly of said enclosure housing, said enclosure housing further including a chute door allowing exiting of said quantity of material dispensed by said material conveyor mechanism out of said enclosure housing.

10. The dispenser arrangement according to claim 6 wherein said tubular housing and auger element are inclined to the vertical and wherein said tubular housing is formed on its lower end with a first lateral opening disposed to receive material urged thereinto by gravity induced by said inclination of said auger element and said tubular housing; and a second lateral opening at its upper end disposed to allow material conveyed by said auger element to exit under the influence of gravity induced by said inclination of said tubular housing and said auger element.

* * * * *